(12) United States Patent
Qureshi et al.

(10) Patent No.: US 11,048,447 B2
(45) Date of Patent: Jun. 29, 2021

(54) PROVIDING DIRECT DATA ACCESS BETWEEN ACCELERATORS AND STORAGE IN A COMPUTING ENVIRONMENT, WHEREIN THE DIRECT DATA ACCESS IS INDEPENDENT OF HOST CPU AND THE HOST CPU TRANSFERS OBJECT MAP IDENTIFYING OBJECT OF THE DATA

(71) Applicant: INTERNATIONAL BUSINESS MACHINES CORPORATION, Armonk, NY (US)

(72) Inventors: Zaid Qureshi, Bronx, NY (US); I-Hsin Chung, Chappaqua, NY (US); Wen-Mei Hwu, Champaign, IL (US); Jinjun Xiong, Goldens Bridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

(21) Appl. No.: 16/656,295

(22) Filed: Oct. 17, 2019

(65) Prior Publication Data
US 2021/0117333 A1   Apr. 22, 2021

(51) Int. Cl.
*G06F 3/06* (2006.01)
*G06F 12/1009* (2016.01)

(52) U.S. Cl.
CPC .......... *G06F 3/0679* (2013.01); *G06F 3/0611* (2013.01); *G06F 3/0655* (2013.01); *G06F 12/1009* (2013.01)

(58) Field of Classification Search
CPC .... G06F 3/0655; G06F 3/0611; G06F 3/0679; G06F 13/28–287
See application file for complete search history.

(56) References Cited

U.S. PATENT DOCUMENTS

| | | | |
|---|---|---|---|
| 7,330,188 B1 * | 2/2008 | Solanki | G06T 15/04 345/503 |
| 8,866,827 B2 | 10/2014 | Zhou et al. | |
| 9,703,670 B2 | 7/2017 | Kumar et al. | |
| 10,147,158 B2 | 12/2018 | Kumar et al. | |
| 10,216,419 B2 | 2/2019 | De | |
| 2006/0227372 A1 * | 10/2006 | Takayanagi | G06K 15/1822 358/1.15 |

(Continued)

OTHER PUBLICATIONS

"Seamless Operating System Integration of Peer-to-Peer DMA Between SSDS and GPUS"; Bergman et al.;2017 USENIX Annual Technical Conference (USENIX ATC '17). Jul. 12-14, 2017 • Santa Clara, CA, USA;(15 Pages).

(Continued)

*Primary Examiner* — Reginald G Bragdon
*Assistant Examiner* — Chie Yew
(74) *Attorney, Agent, or Firm* — Griffiths & Seaton PLLC

(57) ABSTRACT

Embodiments for providing direct access to non-volatile memory by a processor. One or more accelerators may be provided, via an application programming interface ("API"), direct access to non-volatile storage independent of a host central processing unit ("CPU") on a control path or data path to perform a read operation and write operation of data.

20 Claims, 12 Drawing Sheets

(56) References Cited

U.S. PATENT DOCUMENTS

| | | | | |
|---|---|---|---|---|
| 2012/0155187 A1* | 6/2012 | Shelton | .................. | G11C 16/16 |
| | | | | 365/185.33 |
| 2015/0347349 A1* | 12/2015 | Raindel | .................. | G06F 13/28 |
| | | | | 710/308 |
| 2019/0005606 A1* | 1/2019 | Yang | ......................... | G06T 1/60 |

OTHER PUBLICATIONS

"GPU In-Memory Processing Using Spark for Iterative Computation";Hong et al.; 2017 17th IEEE/ACM International Symposium on Cluster, Cloud and Grid Computing; (11 Pages).
"A Novel Data Prefetch Method Under Heterogeneous Architecture"; Authors et. al.: Disclosed Anonymously;IP.com Electronic Publication Date: Dec. 12, 2012; (14 Pages).
"GPU Accelerated Rasterization"; Humphreys; An IP.com Prior Art Database Technical Disclosure; IP.com Electronic Publication Date: Oct. 21, 2014; (7 Pages).

\* cited by examiner

700

API - CPU

| API | Description |
|---|---|
| initialize() | • Sets up GPUDirect/DirectGMA<br>• Sets up NVMe queues and maps them in the GPU memory<br>• Gets the queue pointers and state to be passed to the GPU |
| get_object_map() | • Reads the object map on non-volatile storage so GPU threads can know where on non-volatile storage each object starts<br>• This returned map gets passed to every GPU kernel called |
| Int pcreate(size_t n_bytes) | • Creates new object of n_bytes on the non-volatile storage and adds it to the object map.<br>• Returns the object object id |

FIG. 7A

API - GPU

| API | Description |
|---|---|
| size_t pread(int obj_id, size_t offset, size_t n_bytes, char* buffer); | • reads n_bytes number of bytes starting at the offset in the object with the specified object id of obj_id<br>• stores read data in user provided bufferrn |
| int pread_prefetch(int obj_id, size_t offset, size_t n_bytes); | • Submits the IO request for the pread<br>• Sets a mapping between IO request and NVMe command ID |
| size_t consume_prefetch_pread(int ID, char* buffer, size_t n_bytes) | • Waits until the specified command is finished and consumes its result in a specified buffer. |
| size_t pwrite(int obj_id, size_t offset, size_t n_bytes, char* buffer); | • Writes n-bytes number of bytes starting at the offset in the object with the object id obj_id on the nonvolatile storage |

API - GPU

| API | Description |
|---|---|
| flush() | • Cleans up stale entries in NVMe queues<br>• Waits until all NVMe write commands are finished |
| void* pc_alloc(size_t n_bytes) | • Creates a buffer in the page cache |
| void pc_free(void* addr) | • Frees pages in page cache |

PROVIDING DIRECT DATA ACCESS BETWEEN ACCELERATORS AND STORAGE IN A COMPUTING ENVIRONMENT, WHEREIN THE DIRECT DATA ACCESS IS INDEPENDENT OF HOST CPU AND THE HOST CPU TRANSFERS OBJECT MAP IDENTIFYING OBJECT OF THE DATA

BACKGROUND OF THE INVENTION

Field of the Invention

The present invention relates in general to computing systems, and more particularly to, various embodiments for providing direct access between accelerators and to non-volatile memory and storage in a computing environment.

Description of the Related Art

A popular type of large-scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

SUMMARY OF THE INVENTION

Various embodiments for providing direct access to non-volatile memory in a computing environment are provided. In one embodiment, by way of example only, a method for providing direct access between accelerators and to non-volatile memory storage in a computing environment, again by a processor, is provided. One or more accelerators (e.g., graphics processing units "GPUs") may be provided, via an application programming interface ("API"), direct access to non-volatile storage independent of a host central processing unit ("CPU") on a control path or data path to perform a read operation and write operation of data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7A-7C is a table depicting application programming interface ("API") call descriptions for use with an accelerator in which various aspects of the present invention may be realized.

DETAILED DESCRIPTION OF THE DRAWINGS

Figure 1:
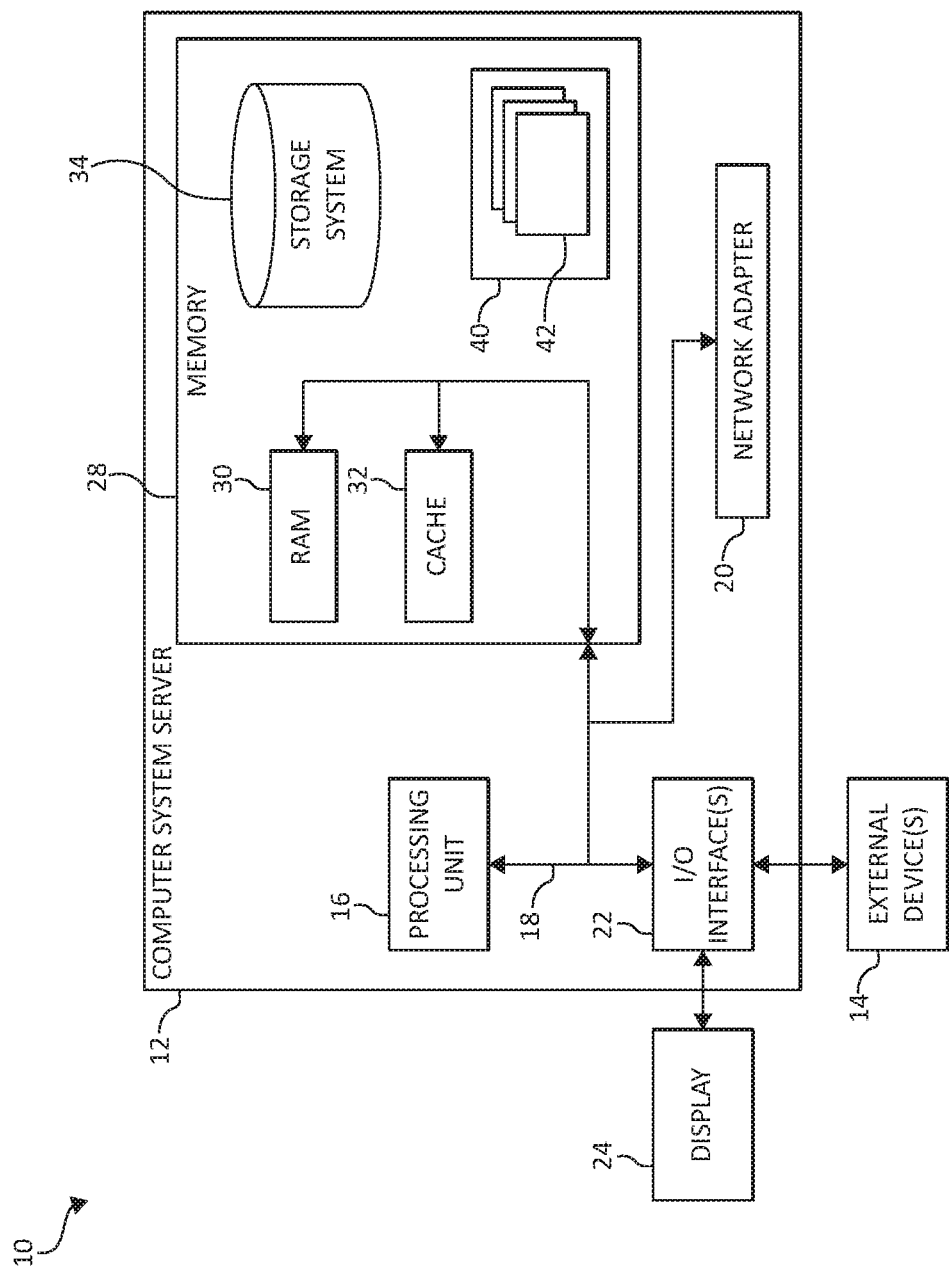
FIG. 1 is a block diagram depicting an exemplary computing node according to an embodiment of the present invention.

Currently, many computer systems employ accelerators (e.g., co-processors such as Graphical Processing Units (GPUs)) to enhance the performance of such system, where programs run on both central processing units ("CPU") and the accelerators. For example, GPU's may engage in performing complex mathematical calculations. Also, the parallel structure of accelerators enables them to be more effective than CPUs for applications/operations that may process large blocks of data.

Moreover, application data is currently stored on non-volatile memory since many times the data is too large to be stored in the GPU/CPU memory. Since the non-volatile memory is managed by the CPU, either the CPU manages the GPU memory (through multiple memory copies and kernel calls) or, the GPU kernel has to request CPU to provide it data and requires synchronization with CPU and queue up requests. Given that GPUs are high throughput devices, a large number of threads execute at the same time. Since all parallel threads could be waiting for data, large latencies are present and occur. Once a block is scheduled on a streaming multiprocessor ("SM") of GPU, the block stays until it is complete. If the threads that are forced to wait for data, execution resources are held and blocks whose data is available are unable execute. As such, GPU resources are being inefficiently managed and incur wasted synchronization operation with the host CPU and waiting for data.

Thus, feeding or providing accelerators such as, for example, GPU's with data at low latency and high bandwidth has become a bottleneck in data intensive applications. Currently, as previously mentioned, accelerators such as, for example, GPU's rely on a host central processing unit ("CPU") to manage the memory of the accelerator and to rely on non-volatile storage to provide data to the accelerators. This adds not only data copy overheads, but also control overheads in the form of synchronization between the high-throughput accelerator and the CPU. In addition, not only does this require additional host resources but, given sub-microsecond access latencies to modern non-volatile memory express ("NVMe") devices, this can add one order of magnitude in latency and substantially reduce data access bandwidth, as illustrated below in FIG. 5A.

In order to fully exploit the low latency/high bandwidth of large capacity NVMe devices, various embodiments of the present invention allow accelerators such as, for example, GPU's to access them directly, without the involvement of the host CPU in the control or the data planes. In one aspect, one or more accelerators (e.g., graphics processing units "GPUs") may be provided, via an application programming interface ("API"), direct access to non-volatile storage independent of a host central processing unit ("CPU") on a control path or data path to perform a read operation and write operation of data.

Thus, the various embodiments described herein, increase the computing efficiency and utilization of compute units available on a GPU since the GPU memory capacity is currently mismatched with the GPU compute capability. Also, the present invention frees up the CPUs to do other useful work in parallel instead of just managing the data transfers between GPUs and storage. The present invention further provides cost saving and reduction in computing power consumption by providing the GPU threads direct access to terabytes of non-volatile memory while also allowing GPU threads to manage GPU memory, instead of relying on CPU from GPU memory management such that the GPU threads can now directly access the data they need.

In additional, the GPU's are enabled to be used even when the data does not fit in GPU's memory, enables the GPUs to be used for more irregular applications with large data (e.g., large graph processing). The present invention further eliminates synchronization between CPU and GPU in order to get more data to the GPU. Also, the prefetching operations, describe herein, allows GPU compute resources to be free until the data for the prefetched blocks are ready in GPU memory (e.g., the data for the requested data blocks are present in GPU memory in a state that they can be used). Also, due to the fact now that here is less reliance on the CPU, the present invention allows for scaling up and more GPUs without incurring additional costs of increasing the number of host CPUs. The present invention further improves fault tolerance and management while also enabling the ability to co-schedule tasks and I/O on one or more GPUs to avoid congestion and to exploit locality.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment or Internet of Things (IoT) network environment. Rather, embodiments of the present invention are capable of being implemented in conjunction with any other type of computing environment now known or later developed. It should be noted that the IoT is an emerging concept involving computing devices that may be embedded in objects, such as appliances, and connected through a network. An IoT network may include one or more IoT devices or "smart devices", which are physical objects such as appliances with computing devices embedded therein. Many IoT devices are independently operable, but they also may be paired with a control system or with a distributed control system such as one running over a cloud computing environment. The control system may include an end-to-end flow monitoring mechanism similar to the one described herein.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
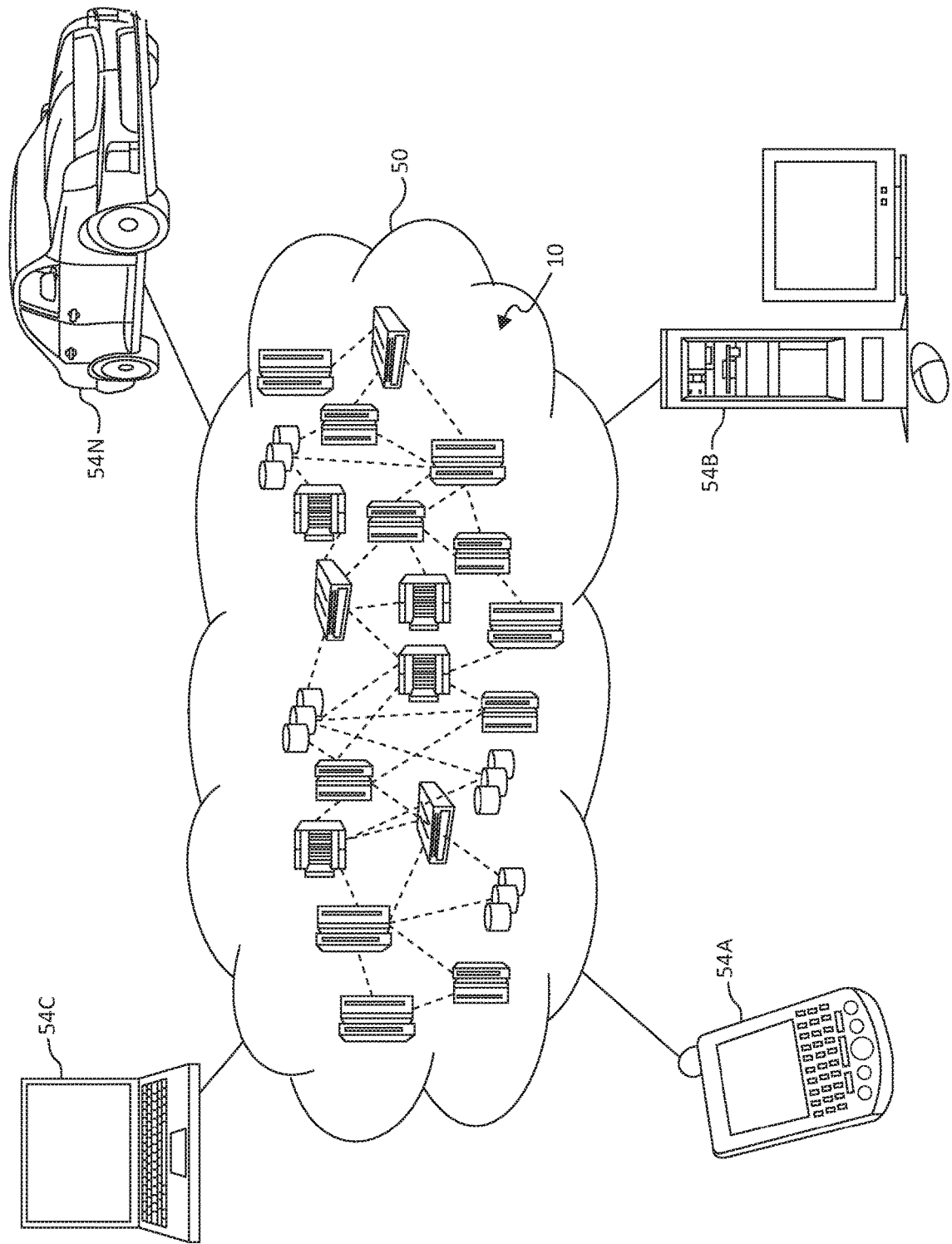
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate.

Nodes 10 may communicate with one another. They may be grouped (not shown) physically or virtually, in one or more networks, such as Private, Community, Public, or Hybrid Clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
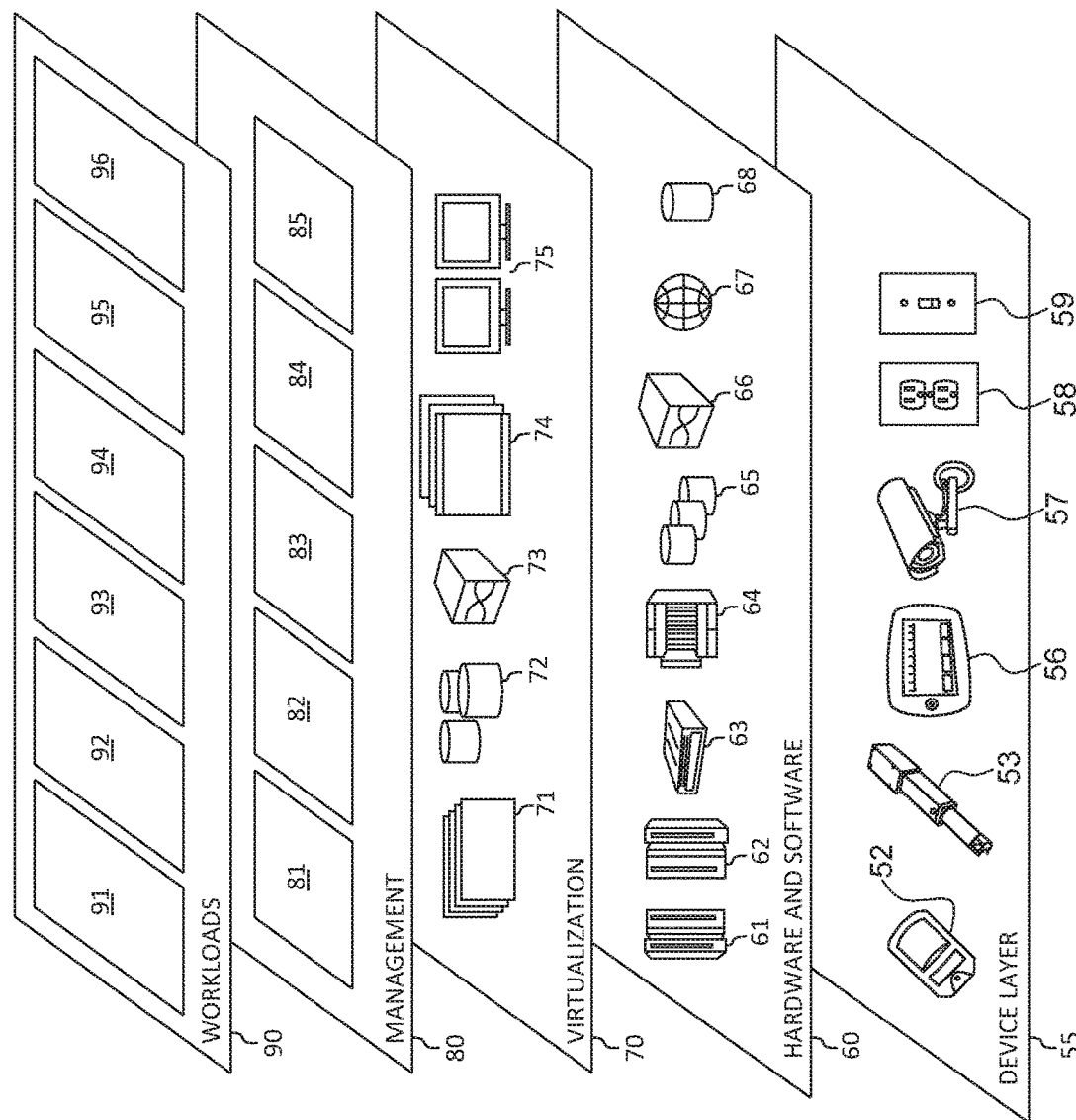
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing direct access between accelerators and to non-volatile memory storage. In addition, workloads and functions 96 for providing direct access between accelerators and to non-volatile memory storage may include such operations as data analysis (including data collection and processing from various environmental sensors), networking, sending/receiving data, providing virtualization/virtual compute, cloud computing communications, and/or management functions. One of ordinary skill in the art will appreciate that the workloads and functions 96 for providing direct access between accelerators and to non-volatile memory storage may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the mechanisms of the present invention provide a novel approach for providing direct access between accelerators and to non-volatile memory storage in a computing environment, again by a processor, is provided. One or more accelerators (e.g., graphics processing units "GPUs") may be provided, via an application programming interface ("API"), direct access to non-volatile storage independent of a host central processing unit ("CPU") on a control path or data path to perform a read operation and write operation of data.

Figure 4:
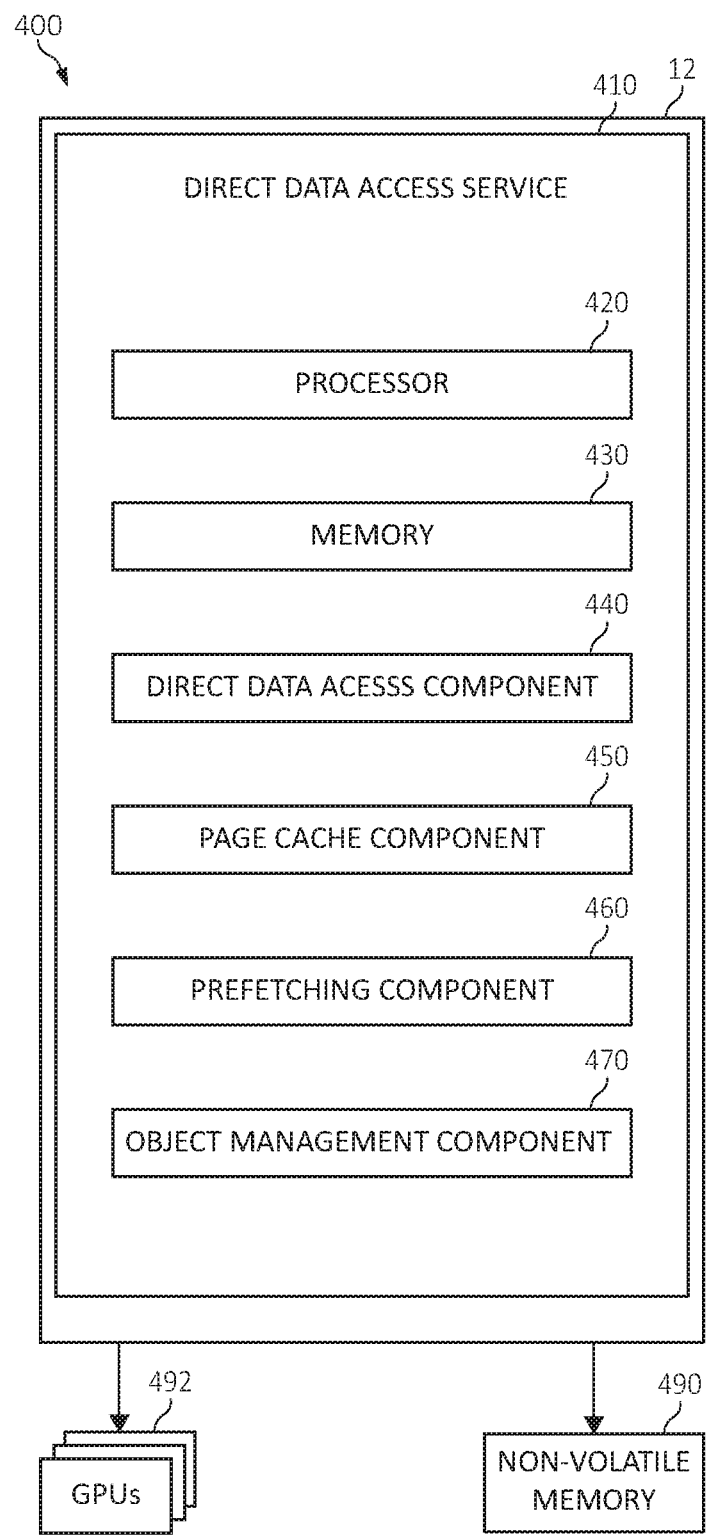
FIG. 4 illustrates a cloud computing network in which various aspects of the present invention may be realized.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. A direct data access service 410 is shown, incorporating processing unit 420 ("processor") to perform various computational, data processing and other functionality in accordance with various aspects of the present invention. In one aspect, the processor 420 and memory 430 may be internal and/or external to the direct data access service 410, and internal and/or external to the computing system/server 12. The direct data access service 410 may be included in computer system/server 12, as described in FIG. 1.

In one aspect, the computer system/server 12 may be in communication with one or more accelerators such as, for example, GPUs 492 (depicted by way of example only) and non-volatile memory 490 (e.g., a solid state drive "SDD"). In one aspect, the GPUs 492 may be included on the computer system/server 12 (e.g., internally located on and/or externally located to the computer system/server 12). Additionally, the non-volatile memory 490 may be included on the computer system/server 12 (e.g., internally located on and/or externally located to the computer system/server 12) and/or the non-volatile memory 490 may be externally located to the computer system/server 12.

The processing unit 420 may be in communication with the memory 430. The direct data access service 410 may include a direct data access component 440, a page cache component 450, a prefetching component 460, and/or an object management component 470.

As one of ordinary skill in the art will appreciate, the depiction of the various functional units in direct data access service 410 is for purposes of illustration, as the functional units may be located within the direct data access service 410 or elsewhere within and/or between distributed computing components.

In one aspect, the direct data access service 410 may provide one or more accelerators via an application programming interface ("API") direct access to non-volatile storage independent of a host central processing unit ("CPU") on a control path or data path to perform a read operation and write operation of data.

The direct data access service 410 may map one or more non-volatile memory express ("NVMe") queues and registers of the non-volatile memory 490 in a memory address space of the one or more accelerators.

The page cache component 450 may use a page cache managed by the one or more accelerators in memory of the one or more accelerators to exploit locality in the data. In the event there are multiple accelerators (e.g., multiple GPUs), the page cache component 450 may use a distributed page cache managed by one or more accelerators in memory of a plurality of accelerators to exploit locality in the data.

The page cache component 450 may copy one or more pages from the non-volatile memory 490 to a page cache and updating a page mapping table. The direct data access service 410 may remove the host CPU from the control path or the data path upon copying the data from the non-volatile memory 490 to the one or more accelerators such as, for example, GPUs 492.

The prefetching components 460 may prefetch the data with the API and saving each compute cycle to overlap computation and movement of the data.

The direct data access service 410, in association with the page cache component 450 and/or the prefetching components, may determine an occurrence of a page cache miss upon receiving one or more API calls for the read operation or the write operation of the data initiated by the one or more accelerators, copy one or more pages from one or more non-volatile memory express ("NVMe") data buffers to a page cache, and/or update page mapping table.

The object management component 470, in a host CPU (e.g., computer system/server 12 and may be internal and/or external to the GPUs 492) may manage an object address for each object in the non-volatile memory 490 upon initiating an application. A map of each object identifier ("ID"), object starting block address, an object size may be managed by the host CPU and may be kept persistent in a reserved section of the non-volatile memory 490. The operations of 800 may assign a sub-range of pages for each object using one or more API calls to the one or more accelerators.

For example, on an application start, host CPU (e.g., computer system/server 12 reads the map using an API call (e.g., "get object map" API call). On a kernel call, instead of passing pointers, the host CPU (e.g., computer system/server 12) passes the starting block address for each object with its size. The GPU's 492 may then know the location of a desired data-structures. The host CPU (e.g., computer system/server 12 may create space and mapping for new objects using another API call (e.g., "pereate" API call). A GPU such as, for example, one of the GPUs 492, may be assigned to a sub-range of pages for each of the objects. The GPU such as, for example, one of the GPUs 492, may be called the home for those pages (e.g., GPU is a home GPU for a page if it owns that page).

Figure 5A:
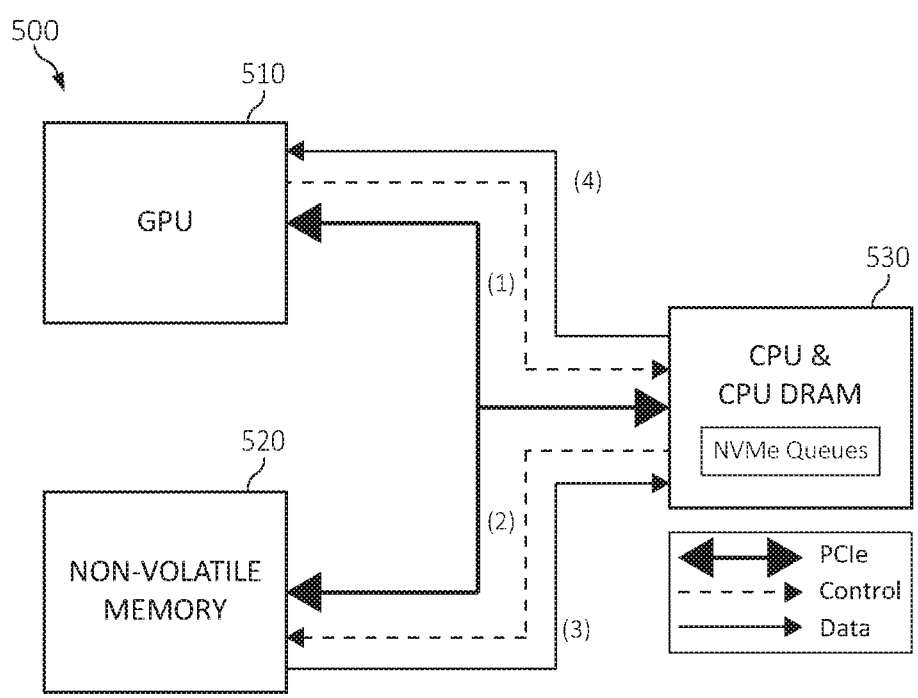
FIG. 5A-5C are block diagrams depicting an exemplary operation for providing direct access between accelerators and to non-volatile memory storage in a computing environment in accordance with aspects of the present invention.
Figure 5B:
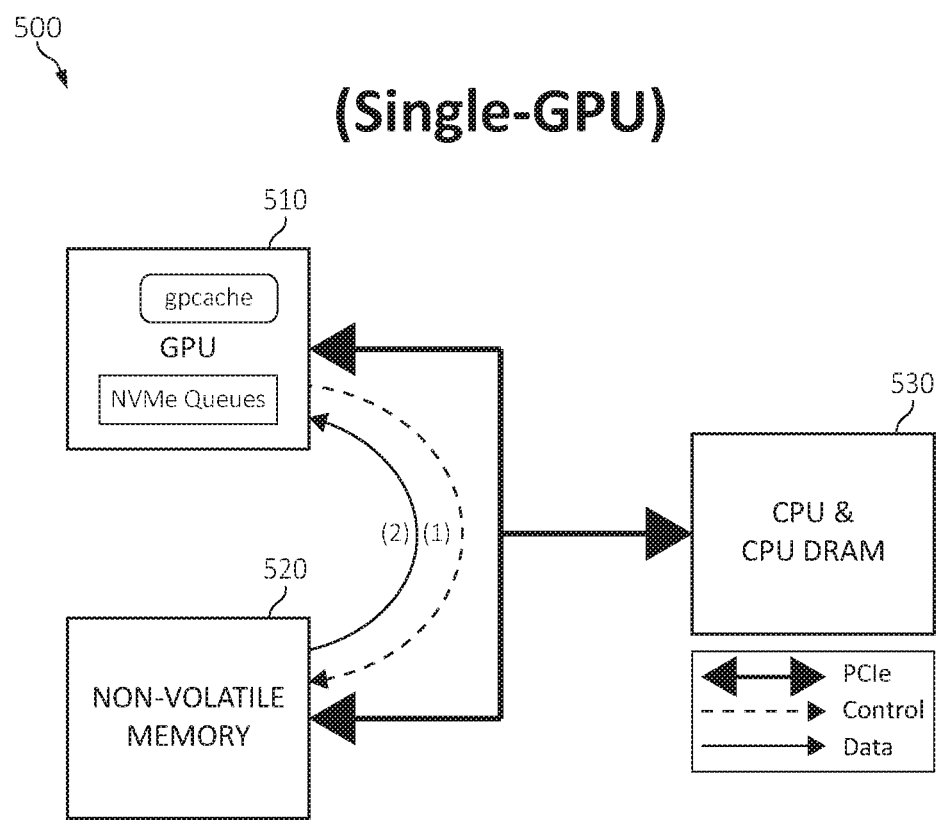
Figure 5C:
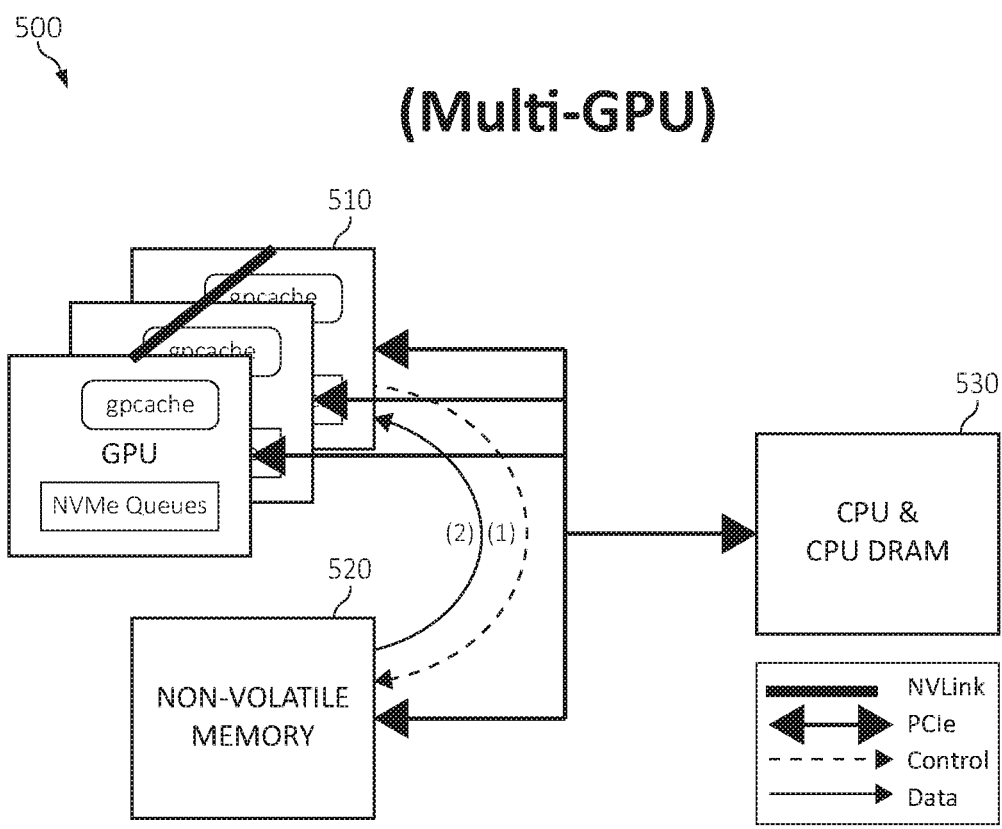

Turning now to FIG. 5A-5C, a block diagram of exemplary functionality 500 relating to providing direct access between accelerators and to non-volatile memory storage is depicted. As shown, the various blocks of functionality are depicted with arrows designating the blocks' 500 relationships with each other and to show process flow. Additionally, descriptive information is also seen relating each of the functional blocks 500 (or "actions steps" or simply "steps"). As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for providing direct access between accelerators and to non-volatile memory storage in accordance with the present invention. Many of the functional blocks 500 may execute as background processes on various components, either in distributed computing components, or on the user device, or elsewhere, and generally unaware to the user. Repetitive description of like elements, components, modules, services, applications, and/or functions employed in other embodiments described herein is omitted for sake of brevity.

As previously mentioned, FIG. 5A depicts GPU 510 relying on a host file system "FS" such as, for example, the host CPU 530 and CPU dynamic random access memory "DRAM" to manage the memory of the GPU 510 and to rely on non-volatile storage 520 to provide data to the GPU 510. This adds not only data copy overheads, but also control overheads in the form of synchronization between the high-throughput accelerator and the CPU 530. The host CPU 530 incurs memory management overhead between the GPU 510 and non-volatile memory 520 of steps 1 and 2. Multiple copies of the data may be passed/feed between the non-volatile storage 520 and the CPU 530, at step 3, and the GPU 530 and the CPU 530, as in step 4. Additionally, GPU threads, blocks, grids may be stalled until data is transferred to the GPU 510, as in step 4. It should be noted that attempts to reduce the data copy overheads by performing direct memory access ("DMA") directly between the GPU 510 and the non-volatile storage 520 exist but this still incurs CPU control/synchronization overheads from CPU 530.

However, using the various embodiments of the present invention, FIG. 5B depicts operations for providing direct access between accelerators and to non-volatile memory storage using a single accelerator (e.g., a single GPU 510). That is, FIG. 5B depicts reducing access overhead/latency and allowing GPU threads of the GPU 510 to directly access the non-volatile storage 520 independent of the CPU 530. In one aspect, the GPU 510 manages the non-volatile storage 520 with a file system "FS" (similar to a simple object store) and leverages a NVMe driver (e.g., using GPU Direct) running on the GPU 510. The CPU 530 is removed from the control path, as in step 1, and the data path, as in step 2. The GPU 510 has access to the entire non-volatile storage 520.

More specifically, FIG. 5B depicts operations of issuing read and write requests from a single accelerator such as, for example, GPU 510 for reducing access overhead/latency and allowing GPU threads of the GPU 510 to directly access the non-volatile storage 520 independent of the CPU 530. In one aspect, an API may enable the GPU threads of the GPU 510 to read and write data on the non-volatile storage 520 using an NVMe without having the host CPU 530 on the control or the data path, as illustrated in the following steps.

In step 1, the host CPU 530 may initialize an interface (e.g., queues and DMA) between GPU and non-volatile storage 520 (via NVMe and a DMA mapping such as, for example, GPUDirect/DirectGMA). In step 2, the host CPU 530 may initiate the transfer of an object map from the non-volatile storage 520 to GPU memory of the GPU 510 so GPU threads know where each object is on the non-volatile storage 520. In step 2(1), an entry in the map may be a key value pair with an object identifier ("ID") as a key and a starting address on non-volatile storage 520 as the value. In step 2(2), an application of the host CPU 530 may indicate to the GPU 510 which object to use by passing appropriate object IDs as parameters to GPU kernel launches. In step 3, the host CPU 530 may launch GPU kernels such as, for example, in normal application except with object IDs as parameters (from step 2(2)).

In step 4, the GPU kernel threads may read and/or write data on the non-volatile storage 520 using one or more API calls such as, for example, "pread" and "pwrite" API calls provided.

In step 5, when a GPU thread issues the pread API call, a GPU page cache may be checked by the GPU thread (e.g., the thread that calls the API call and is checked by the GPU thread) to determine if requested pages are in GPU memory of the GPU 510. In step 5(1), if the pages are in memory of the GPU 510 then the data is copied from the page cache to a user-allocated destination buffer (e.g., the destination buffer may be a user allocated buffer in the GPU memory that the user may read and write and may be allocated using one or more API's). In step 5(2), if the pages (or a subset of pages) are not located in a GPU page cache, the calling GPU thread may, prepare an NVMe command for the missing pages, as in 5(2)(1)), atomically add the NVMe command to the NVMe submission queue and rings NVMe doorbell, as in step 5(2)(2) without using the CPU 530 in the control path, as in step 5(2)(2)(1), polls the NVMe completion queue until request is completed, as in step 5(2)(3), with the data between the GPU 510 and NVMe device is copied directly between each other without interference of CPU 520, as in step 5(2)(3)(1), and copies data from a NVMe IO buffers region to a user provided buffer, as in as in step 5(2)(4), and updates a page cache state, as in as in step 5(2)(5).

Additionally, in step 6, when a GPU thread issues a pwrite API, the calling thread may: update page cache state, as in step (6)(1), prepare an NVMe command to write pages to non-volatile storage, as in step (6)(2), atomically add the command to the NVMe submission queue and rings NVMe doorbell, as in step (6)(3) (e.g., without using the CPU 530 in the control path), as in step 5(2)(2)(1), polls a NVMe completion queue until request is completed, as in step (6)(4) (e.g., the data between the GPU 510 and NVMe device is copied directly between each other without interference of CPU 520), as in step 5(2)(3)(1), and frees its buffers, as in as in step (6)(7).

In step 7, the GPU thread may issue preads and pwrites API calls, however many times it wants and steps 1(5) and 1(6) may be repeated respectively.

In the event of multiple GPUs, FIG. 5C depicts operations for providing direct access between multiple GPUs 510 (e.g., 510 in FIG. 5C depicts a group of GPUs) and the non-volatile memory storage 520. Before accessing the NVMe, the GPUs 510 exchange data among each other to verify whether data already exists in a different GPU cache.

In one aspect, object pages are hashed to one or more specific GPUs 510. GPUs 510 may either own an object page, in which case the object page may be located in a cache of the one or more specific GPUs 510 or the GPUs 510 may be responsible to retrieve the object page. Also, the GPUs 510 may request a page from the owning GPU of the group of GPUs 510.

Figure 6:
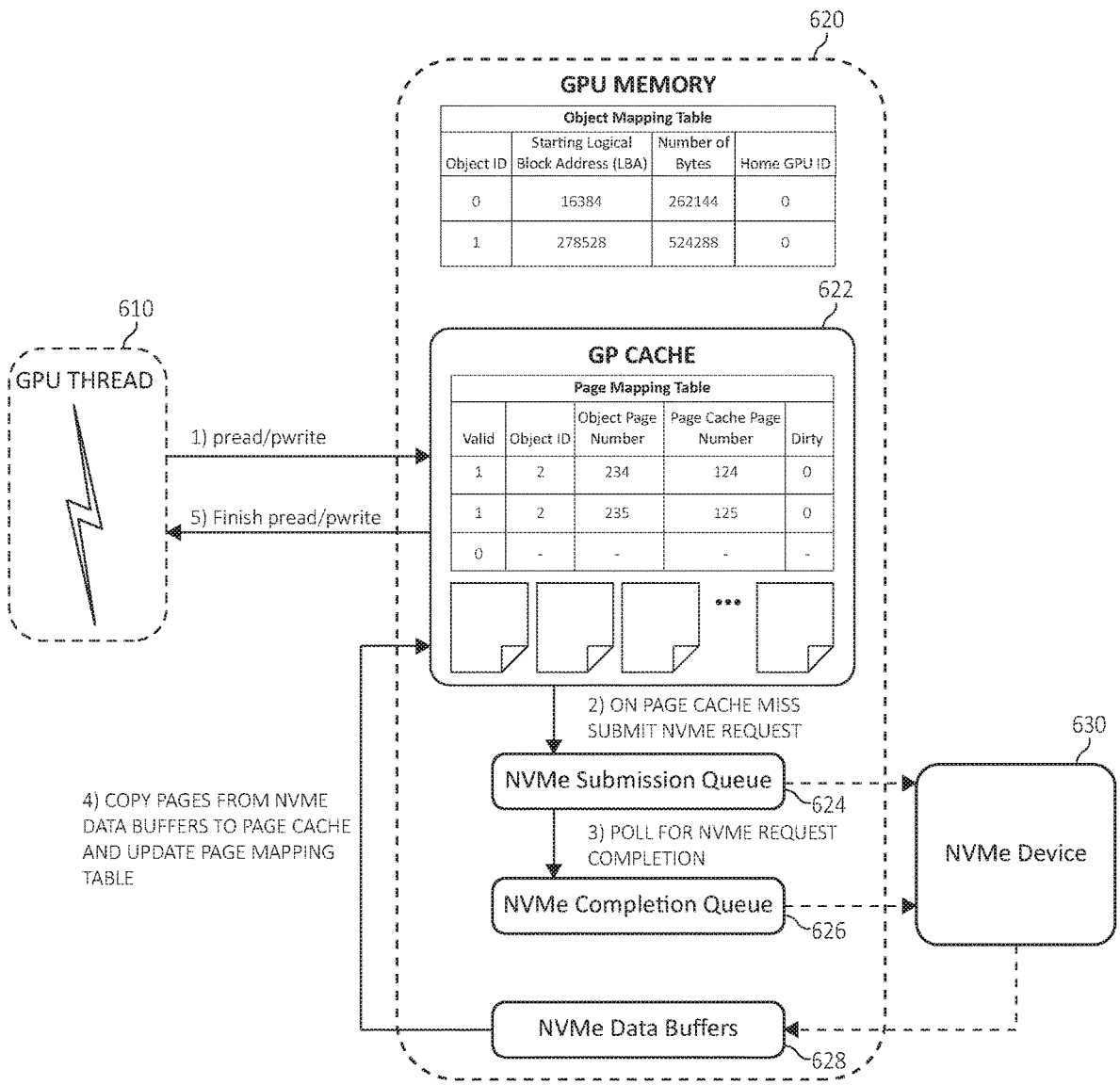
FIG. 6 is a block diagram depicting exemplary accelerator page cache organization and application programming interface ("API") in which various aspects of the present invention may be realized.

Turning now to FIG. 6, block diagram 600 depicts exemplary operations for using accelerator page cache organization and application programming interface ("API"). In one aspect, each of the devices, components, modules, operations, and/or functions described in FIGS. 1-5A-5C also may apply or perform one or more operations or actions of FIG. 6.

In step 1, an API call (e.g., a pread API call and/or a pwrite API) may be issued to a GPU page cache ("gpcache") in a GPU memory 620. In step 2) determining an occurrence of a page cache miss and submit an NVMe request to an NVMe submission queue 624 for access to an NVMe device 630, upon receiving one or more API calls call (e.g., a pread API call and/or a pwrite API) for the read operation or the write operation of the data initiated by the one or more accelerators (e.g., GPU thread 610). In step 3, poll for the NVMe request completion using the NVMe device 630 is completed and provided to the NVMe completion queue 626.

In step 4, pages may be copied from the NVMe data buffers 628 to the page cache 622 and the page/object mapping table may be updated.

In the event of providing direct access between accelerators and to non-volatile memory storage using a single accelerator (e.g., a single GPU 510 of FIG. 5B), the following operations steps may be performed using a page cache (e.g., application/software managed page cache) in the GPU memory to exploit locality in data.

In step 1), a page table may be maintained in the GPU memory 620 (e.g., a GPU global memory) that stores mapping of pages from object data to GPU global memory address of the GPU memory 620 (e.g., a GPU global memory). In step (1)(1), a mapping only exists if the page is in located in the GPU memory 620.

In step 2, page cache pages may be kept in a least recently used ("LRU") list. In step 2(1), on a pread or write API call request, if there are insufficient free pages (e.g., not enough free pages), the LRU pages may be written back if dirty, unmapped from previous mapping, and remapped for new mapping.

In step 3(1), on a pread API call, each requested page may be checked for in the page cache. If pages are in page cache, data may be copied from there to the user provided buffer, as in step 3(2). In step 3(2), input/output ("I/O") request for pages that are not located in the page cache 622 may be created. In step 3(2)(1), mappings in the page table may be created for newly requested pages.

In step 4(1), on a pwrite API call, pages from the page cache's LRU list get allocated, data from the user specified buffer is copied to these pages, and page mappings for destination pages in an object on nonvolatile storage 630 may be updated to point to the appropriate pages. In step 4(2), when a write I/O request completes, a bit may be set in a page table entry for the page(s). In step 4(2)(1), performing an additional write-back operation (from step 2(2)(4)(1)), may be performed in case of eviction. In step 5) one or more read/write operations may be performed.

It should be noted that in the event of providing direct access between accelerators and to non-volatile memory storage using multiple accelerators (e.g., a group of GPU 510 of FIG. 5C using a distributed page cache for a multi-GPU computing environment), the following operations steps may be performed using a page cache (e.g., application/software managed page cache) in the GPU memory to exploit locality in data.

In step 1, a GPU (e.g., GPU 510 of FIG. 510) may be assigned to a sub-range of pages for objects. The GPU may be called the home for those pages. In step 1(1), each GPU may also be assigned a unique ID.

In step 2, the home GPU 510 maintains/keeps a mapping of those pages for whom the GPU 510 is designated as the home. In step 2(1), the mapping operations may map which other GPUs are caching the page. In step 2(2)(2), if the page is located in a GPU's page cache, the GPU ID and the memory address may be maintained inside the page cache of that particular GPU in the group of GPUs. In step 2(3), alternatively, if the page is not located in the GPU's page cache, the page is located in the non-volatile storage 520.

In step 3, when a pread API call of the GPU memory 620 is unable to locate the requested pages in the local page cache, the GPU memory 620 submits a request to the home GPU(s) of those pages. In step 3(1), the home GPU may check if the page is located in another GPU's page cache. In step 3(1)(1), If the page is located in another GPU's page cache, the GPU memory 620 may respond with the GPU ID and page cache address so that the requesting GPU may copy the page(s) from that GPU's page cache, otherwise, the home GPU allows the requesting GPU to know that the pages are in non-volatile memory 620 and updates its mapping table, as in step 3(1)(2), and the requesting GPU submits an I/O request, as in step 3(2)(1).

In step 4, when the GPU thread 610 executes a pwrite on some pages, the GPU thread 610 submits a request to the home GPU(s) of those pages. In step 4(1), the home GPU may check if other GPUs have the pages that are about to be overwritten in their page cache. In step 4(1)(1), If other GPUs have the pages that are about to be overwritten in their page cache, the home GPU may invalidate all of those pages in those alternative GPUs' page caches and updates its own mapping. In step 4(1)(2), if other GPUs do not have the pages that are about to be overwritten in their page cache, the home GPU lets the requesting GPU know that the pages are in non-volatile memory 630 and updates that the mapping table be updated after the requesting GPU finishes its I/O request. In step 4(1)(2)(1), the requesting GPU may submit an I/O request.

In step 5, a thread on each GPU may be dedicated to handling requests from other GPUs.

It should be noted that the prefetching operations, as described herein (e.g., FIGS. 4-5B-5C), may be performed using one or more operations. For example, consider the following two operations for performing the prefetching operations.

In prefetching operation 1, the following operations for prefetching data and passing it between thread blocks, may be performed as follows. In step 1, a GPU such as, for example, GPU 510 may launch one or more thread block(s) (hereinafter referred to as I/O blocks) that are only responsible for issuing corresponding I/O requests for those block's preads using the preadprefetch API call.

In step 2, the threads in the I/O blocks may create and submit an NVMe request. In step 2(1), all the same actions performed in steps 1(5)(2)(1) until 1(5)(2)(2) for reading and writing request from a single GPU may be performed. In step 2(2), a thread does not poll for completion (e.g., asynchronous). In step 2(3), a thread may create a mapping for I/O requests to the NVMe command IDs. This mapping is used later by GPU thread when polling the completion queue to find the completion entry for the command submitted for prefetching.

In step 3, when real compute thread block is scheduled and the GPU threads issue a pread API call, first, the mapping may be checked to see if the request was already made, as in step 3(1). If the request was issued/made, the GPU thread polls on the NVMe completion queue 626 for that NVMe command ID using a consumeprefetchpread API call, as in step 3(2), otherwise it proceeds, as in step 3(3) (similar to steps 1(5)(2)(4) for reading and writing request from a single GPU may be performed). In this way, one or more cycles of the GPU streaming multiprocessors ("SMs") are not wasted in waiting for I/O to complete.

In prefetching operation 2, the following operations for prefetching data and overlapping computation and data movement, may be performed as follows. In step 1, each GPU thread block may be multiplexed to execute the computation for multiple thread blocks.

In step 2, the GPU thread block may process the multiple thread blocks mapped to it by pipelining the blocks.

In step 3, a GPU thread block may initiate the I/O request for one block using preadprefetch API call.

In step 4, the GPU thread block may execute the computation for another thread block with its data in the block's buffer.

In step 5, the GPU thread block may consume the data for the I/O request submitted for a third block into the block's buffer using the consumeprefetchpread API call. In step 5(1), the I/O request for steps 3(2)(3) described herein may be overlapped with computation in the steps 3(2)(4).

In step 6, each GPU thread block can execute steps 3(2)(2) up to steps 3(2)(5) for using the distributed page cache for the multi-GPU computing environment until all thread blocks are exhausted.

Turning now to FIGS. 7A-7C, a table 700 illustrating the application programming interface ("API") call descriptions for use with a GPU is depicted. In one aspect, each of the devices, components, modules, operations, and/or functions described in FIGS. 1-6 also may use one or more API calls of FIGS. 7A-7C.

A "initialize( )" API call may be used to set up GPUDirect/DirectGMA, set up NVMe queues and map the NVMe queues in the GPU memory, and retrieves/gets the NVMe queue pointers and state to be passed to the GPU.

A "get object map( )" API call may read an object map on non-volatile storage so GPU threads may know where on non-volatile storage each object starts. The returned map may be passed to every GPU kernel called.

A "int_pereate(size_t_n_bytes)" API call may create new object of "n_bytes" number of bytes in size on the non-volatile storage and adds the new object to the object map. The object ID may be returned.

A "size_t_pread(int_obj_id, size_t_offset, size_t_n_bytes, char*buffer)" may be an API call that reads "n_bytes" number of bytes starting at the specified "offset" in the object with the with object ID "obj_id" on the non-volatile storage and stores the read data in the user provided buffer. That is, the object ID (e.g., "obj_id") may be a unique identifier for an object. Each object stored in the non-volatile memory may have a unique identifier so that it can be used to specify the object when using a general API-like pread. The object ID (e.g., "obj_id") may be a file descriptor or file path.

A "int pread_prefetch(int obj_id, size_t_offset, size_t_n_bytes)" API call submits the 10 request for the pread, sets a mapping between an I/O request and NVMe command ID.

A "size_t_consume_prefetch_pread(int ID, char*buffer, size_t_n_bytes)" API call waits until a specified command is finished and consumes the result in a specified buffer.

A "size_t pwrite(int obj_id, size_t_offset, size_t_n_bytes, char*buffer)" API call may write "n_bytes" number of bytes number of bytes starting at an offset in the object with the with object id "obj_id" on the nonvolatile storage.

A "flush( )" API call may clean up stale entries in NVMe queues a wait until all NVMe write commands are finished.

Figure 8:
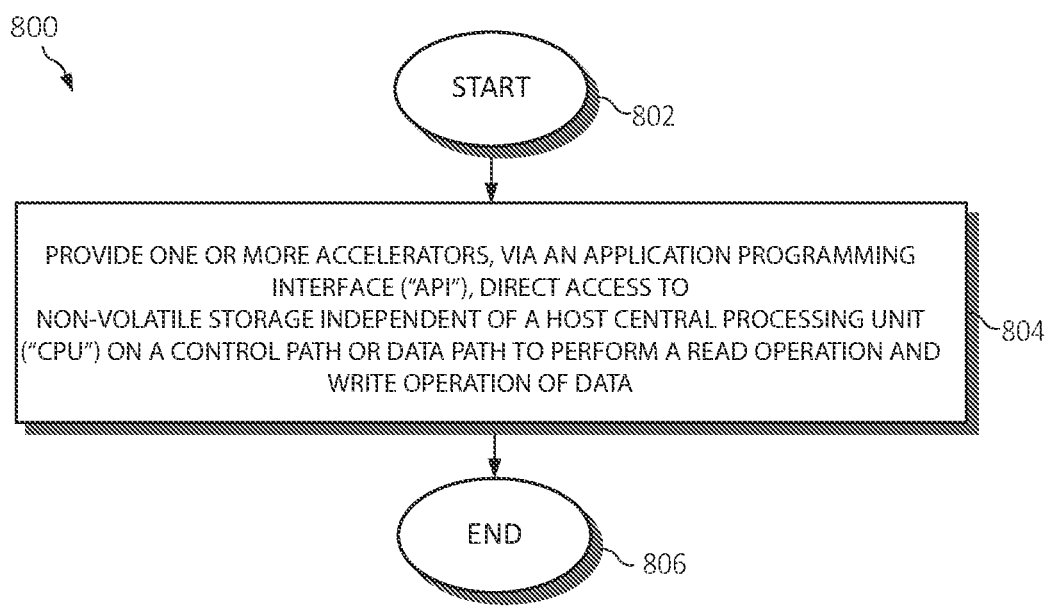
FIG. 8 is a flowchart diagram depicting an exemplary method for providing direct access between accelerators and to non-volatile memory storage in a computing environment, again in which various aspects of the present invention may be realized.

Turning now to FIG. 8, a method 800 for providing direct access between accelerators (e.g., graphics processing units "GPUs") and to non-volatile memory storage in a computing environment is depicted. In one aspect, each of the devices, components, modules, operations, and/or functions described in FIGS. 1-7 also may apply or perform one or more operations or actions of FIG. 8. The functionality 800 may be implemented as a method executed as instructions on a machine, where the instructions are included on at least one computer readable medium or one non-transitory machine-readable storage medium. The functionality 800 may start in block 802.

One or more accelerators may be provided, via an application programming interface ("API"), direct access to non-volatile storage independent of a host central processing unit ("CPU") on a control path or data path to perform a read operation and write operation of data, as in block 804. The functionality 800 may end, as in block 806.

In one aspect, in conjunction with and/or as part of at least one block of FIG. 8, the operations 800 may include one or more of each of the following. The operations of 800 may map one or more non-volatile memory express ("NVMe") queues and registers in a memory address space of the one or more accelerators. The operations of 800 may use a page cache managed by the one or more accelerators in memory of the one or more accelerators to exploit locality in the data, and/or use a distributed page cache managed by the one or more accelerators in memory of for a plurality of accelerators to exploit locality in the data.

The operations of 800 may copy one or more pages from the non-volatile storage to a page cache and updating a page mapping table. The operations of 800 may remove the host CPU from the control path or the data path upon copying the data from the non-volatile storage to the one or more accelerators. The operations of 800 may prefetch the data with the API and saving compute cycles to overlap computation and movement of the data. The operations of 800 may determine an occurrence of a page cache miss upon receiving one or more API calls for the read operation or the write operation of the data initiated by the one or more accelerators, copy one or more pages from one or more non-volatile memory express ("NVMe") data buffers to a page cache, and/or update page mapping table.

The operations of 800 may receive an object address for each object in the non-volatile storage upon initiating an application. A map of each object identifier ("ID"), object starting block address, an object size may be managed by the host CPU and may be kept persistent in a reserved section of the non-volatile storage. The operations of 800 may assign a sub-range of pages for each object using one or more API calls to the one or more accelerators.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or host servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing direct access to non-volatile storage in a computing environment by a processor, comprising:
providing one or more accelerators, via an application programming interface ("API"), direct access to the non-volatile storage on a control path or data path to perform a read operation and write operation of data of objects, wherein the direct access is independent of a host central processing unit ("CPU");
and the host CPU initiates transfer of an object map from the non-volatile storage to the one or more accelerators, wherein the object map identifies the objects on the non-volatile storage.

2. The method of claim 1, further including mapping one or more non-volatile memory queues and registers in a memory address space of the one or more accelerators.

3. The method of claim 1, further including using a page cache in memory of the one or more accelerators to exploit locality in the data, wherein the page cache is managed by the one or more accelerators.

4. The method of claim 1, further including using a distributed page cache in memory of the one or more accelerators to exploit locality in the data, wherein the distributed page cache is managed by the one or more accelerators.

5. The method of claim 1, further including:
copying one or more pages from the non-volatile storage to a page cache and updating a page mapping table; or
removing the host CPU from the control path or the data path upon copying the data from the non-volatile storage to the one or more accelerators.

6. The method of claim 1, further including prefetching the data with the API and saving compute cycles to overlap computation and movement of the data.

7. The method of claim 1, further including:
determining an occurrence of a page cache miss upon receiving one or more API calls for the read operation or the write operation of the data initiated by the one or more accelerators;
copying one or more pages from one or more non-volatile memory data buffers to a page cache;
and updating a page mapping table.

8. A system for providing direct access to non-volatile storage, comprising:
one or more computers with executable instructions that when executed cause the system to:
provide one or more accelerators, via an application programming interface "API"), direct access to the non-volatile storage on a control path or data path to perform a read operation and write operation of data of objects, wherein the direct access is independent of a host central processing unit ("CPU");
and the host CPU initiates transfer of an object map from the non-volatile storage to the one or more accelerators, wherein the object map identifies the objects on the non-volatile storage.

9. The system of claim 8, wherein the executable instructions map one or more non-volatile memory queues and registers in a memory address space of the one or more accelerators.

10. The system of claim 8, wherein the executable instructions use a page cache in memory of the one or more accelerators to exploit locality in the data, wherein the page cache is managed by the one or more accelerators.

11. The system of claim 8, wherein the executable instructions use a distributed page cache in memory of a plurality of accelerators to exploit locality in the data, wherein the distributed page cache is managed by the one or more accelerators.

12. The system of claim 8, wherein the executable instructions:
copy one or more pages from the non-volatile storage to a page cache and updating a page mapping table; or
remove the host CPU from the control path or the data path upon copying the data from the non-volatile storage to the one or more accelerators.

13. The system of claim 8, wherein the executable instructions prefetch the data with the API and saving each compute cycle to overlap computation and movement of the data.

14. The system of claim 8, wherein the executable instructions:
determine an occurrence of a page cache miss upon receiving one or more API calls for the read operation or the write operation of the data initiated by the one or more accelerators;
copy one or more pages from one or more non-volatile memory data buffers to a page cache;
and update page mapping table.

15. A computer program product for, by a processor, providing direct access to non-volatile storage, the computer program product comprising a non-transitory computer-readable storage medium having computer-readable program code portions stored therein, the computer-readable program code portions comprising:
an executable portion that provides one or more accelerators, via an application programming interface ("API"), direct access to non-volatile storage on a control path or data path to perform a read operation and write operation of data of objects, wherein the direct access is independent of a host central processing unit ("CPU");
and the host CPU initiates transfer of an object map from the non-volatile storage to the one or more accelerators, wherein the object map identifies the objects on the non-volatile storage.

16. The computer program product of claim 15, further including an executable portion that maps one or more non-volatile memory queues and registers in a memory address space of the one or more accelerators.

17. The computer program product of claim 15, further including an executable portion that:
uses a page cache in memory of the one or more accelerators to exploit locality in the data, wherein the page cache is managed by the one or more accelerators;
or uses a distributed page cache in memory of a plurality of accelerators to exploit locality in the data, wherein the distributed page cache is managed by the one or more accelerators.

18. The computer program product of claim 15, further including an executable portion that:
copies one or more pages from the non-volatile storage to a page cache and updates a page mapping table;
or removes the host CPU from the control path or the data path upon copying the data from the non-volatile storage to the one or more accelerators.

19. The computer program product of claim 15, further including an executable portion that prefetches the data with the API and saving each compute cycle to overlap computation and movement of the data.

20. The computer program product of claim 15, further including an executable portion that:
determines an occurrence of a page cache miss upon receiving one or more API calls for the read operation or the write operation of the data initiated by the one or more accelerators;
copies one or more pages from one or more non-volatile memory data buffers to a page cache;
and updates page mapping table.

* * * * *